March 30, 1943. H. VAILLANT 2,315,300
ARMATURE WINDING
Filed April 15, 1942 2 Sheets-Sheet 2
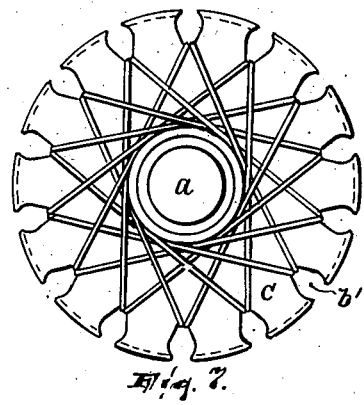
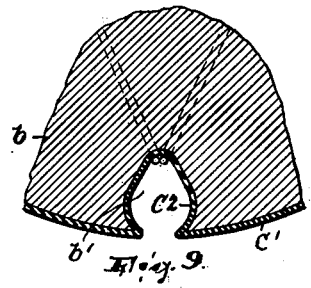
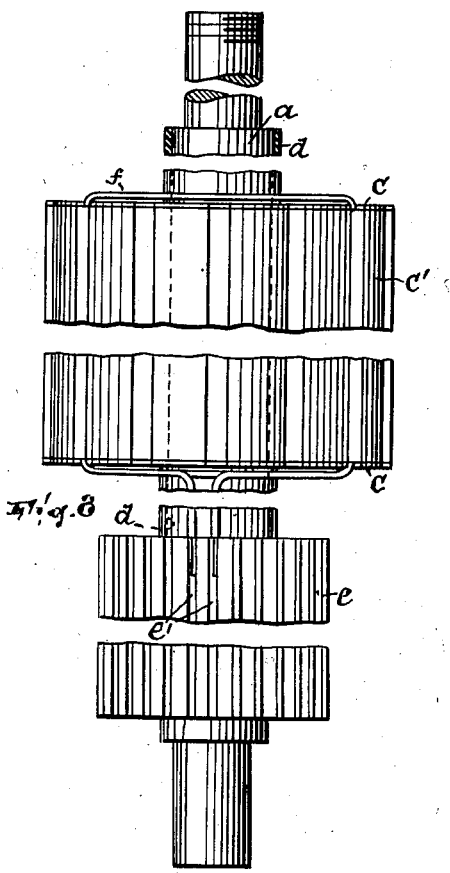
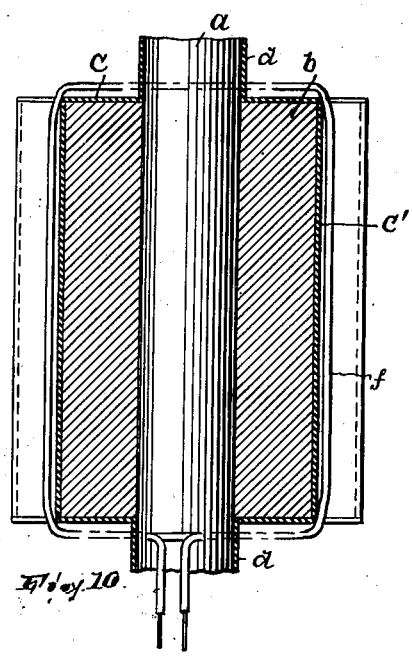
INVENTOR,
Henry Vaillant,
BY John Steward,
ATTORNEY.

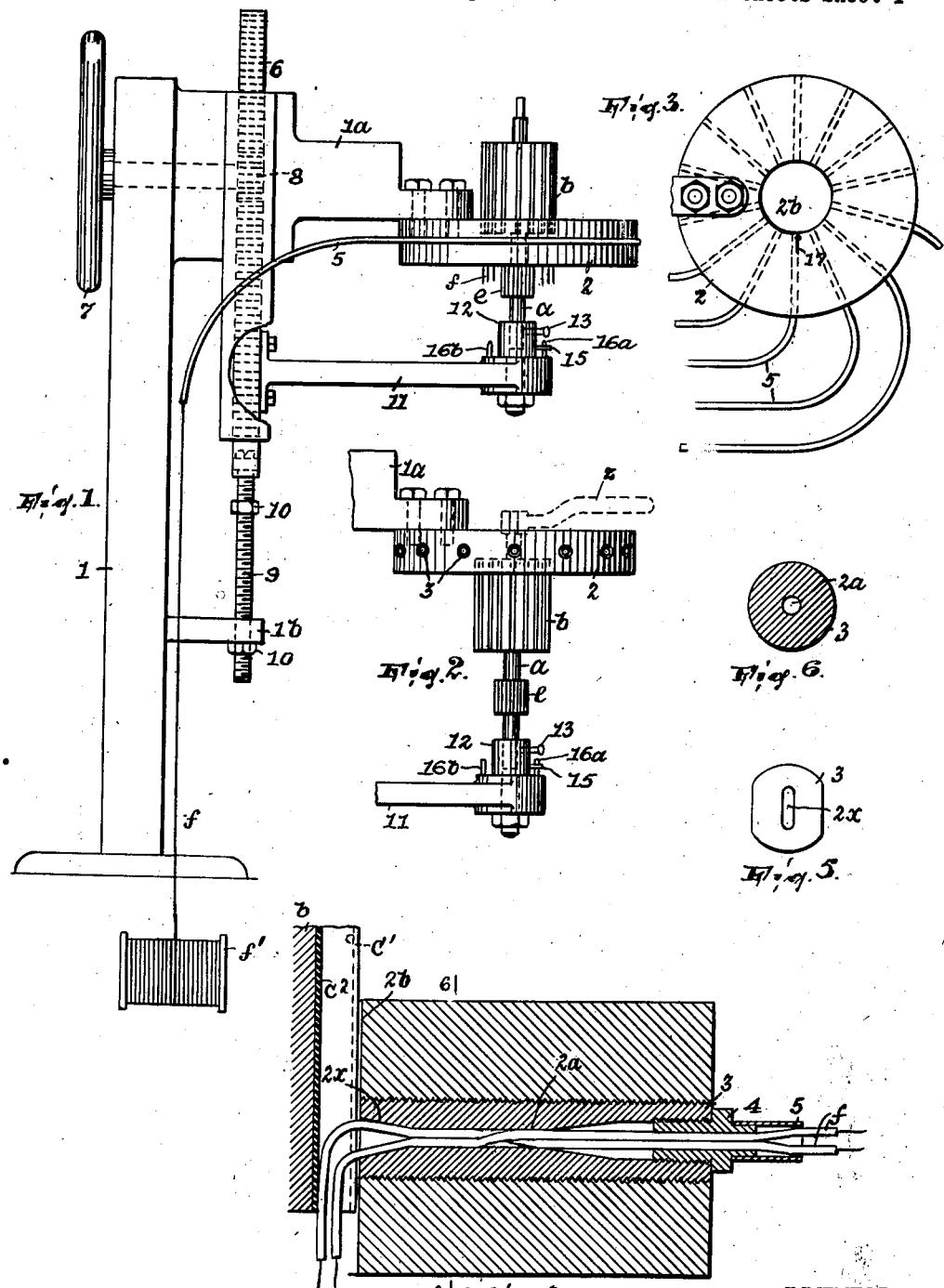

Patented Mar. 30, 1943

2,315,300

UNITED STATES PATENT OFFICE 2,315,300

ARMATURE WINDING

Henry Vaillant, Paterson, N. J.

Application April 15, 1942, Serial No. 439,147

11 Claims. (Cl. 242—13)

This invention relates to the winding of armatures and it has for its object to provide a machine by which the wires may be wound on the core of the armature so as to produce a balanced disposition of the several coils at the ends of the core body and effect the winding much more expeditiously than is possible when the winding is performed by the usual hand method. There is a form of winding which is effected by machine and hence with saving of time, to wit, what is known as lap-winding in which each coil is completed before the next succeeding coil is started, but this results in an undue localized piling up of the coils at the end of the core body, with consequent unbalance. According to the prevailing hand-winding (or so-called form-winding) procedure individual loops, as distinct from completed coils, are positioned successively on and so as to embrace the core, thus distributing the windings uniformly so that a balanced condition results. By the machine herein set forth, and as will appear, the completed armature exists substantially the same as in the form-wound armature produced by hand but its production involves a very considerable saving in labor and time.

In the drawings,

Fig. 1 is a side elevation of the machine, partly broken away;

Fig. 2 is a fragmentary side elevation showing the head of the machine and the plunger and armature supported thereby depressed;

Fig. 3 is a plan of the head and wire-guiding tubes;

Fig. 4 is a fragmentary vertical section of the head and armature, showing the latter partly depressed;

Figs. 5 and 6 are, respectively, an end elevation and a section, on line 6—6, Fig. 4, of one of the bored wire delivery elements of the head;

Fig. 7 is a top plan view of the armature, partly wound, and Fig. 8 a side view thereof;

Fig. 9 a fragmentary horizontal section of the armature core body, showing insulation; and Fig. 10 is a view showing the core body in vertical section in a chord cutting two of its grooves, a single loop of the wire occupying said grooves being shown in elevation.

The armature core is here of the usual construction, comprising a shaft $a$, a core body $b$ thereon having longitudinal peripheral grooves $b'$ equally spaced circumferentially thereof, and suitable insulation disposed thereon as follows: Insulating disks $c$ covering the end faces of body $b$; insulating sleeves $d$ embracing shaft $a$ adjacent said body; and an insulating band $c'$ closely embracing such body and made to line its grooves at $c^2$. The portions between the grooves or at the periphery of the body are to be removed when the winding is completed. In this example there are fourteen grooves in the armature, but the number, of course, is not material. $e$ is the commutator provided with twice the number of slits $e'$, each two slits (here adjoining ones) to receive the two ends of a wire.

The frame of the machine in the example shown is formed by a standard $I$ whose base is to be fixed to a bench below which will be the supplies, as spools $f'$, for the (insulated) wires, said standard having an upper arm $Ia$ and a lower arm $Ib$. Fast to arm $Ia$ is an annular head $2$ arranged in a horizontal plane. This head has fourteen radial and equally spaced bores $2a$ formed around the passage or aperture $2b$ and here formed by plugs set in the head proper but in effect one with the head; that is to say, 3 designates tubular plugs screwed into the head proper radially and 4 are tubular nipples screwed into the plugs at their outer ends and having attached to them tubes 5 preferably all directed off (but in curves of appreciable radius) in a common horizontal plane and generally toward the standard, the passages thus formed by said bores and those of the nipples and tubes being adapted to guide the wires reaching from the supplies $f'$ to the passage $2b$ of the head and so that they all issue thereat in equally spaced disposition around its axis. By resort to the tubes and confining them all to substantially the same approximately horizontal plane access to positions above and below the head may be had in the necessary manual operations. In some instances a plurality of wires will be threaded through each passage wherefore, so that such plurality shall issue in a common vertical plane, the inner or delivery end of each bore $2a$ is a vertical slot, as at $2x$, Fig. 5, formed, say, by flattening the inner end of plug 3 after it has been bored.

The standard provides for guiding vertically a rack 6 to be reciprocated here by manual means, as a hand-wheel 7 journaled in the standard and geared at 8 with the rack. Forming a fixed part of the rack is a depending threaded shank 9 freely movable through a hole in arm $Ib$ of the standard and having nuts $I0$ thereon which, on adjustment on the shank and by abutting the arm, determine the limits of up and down movement of the rack, to wit, with regard to the length of the core body.

The rack has a horizontal arm $II$. The rack, its shank and arm form what is in effect a plunger, its said arm extending under the central passage or aperture 2b of the head.

Oscillatory on the plunger arm 11 coaxially with the head but confined thereto against displacement axially thereof is a turret 12 formed as a socket into which is to be stepped the reduced terminal of that part of the armature shaft which carries the commutator e, to be thereupon made fast to the turret, as by a set-screw 13. The turret has a stud 15 to engage stops 16a—16b to limit its rotation through a given number of degrees, depending on the number of degrees apart of any two grooves in the armature core that together are to receive any single coil or winding of a wire or wire unit (by which latter I mean to include both a single wire or a plurality if a pair or more are to be manipulated together in the winding into each of any two such slots); in the present instance, each coil is to be received in grooves separated by five other grooves.

On the head, preferably at its upper surface and near its aperture, is an index or pointer 17.

The winding is effected as follows:

The wires f which are to complete the armature (here fourteen in number) are reeved through what I term guides formed by the plugs 3, nipples 4 and tubes 5 so that their inner ends project to the proper extent into the passage 2b of the head (preferably inward of a circle of the same diameter as the core body), they existing substantially equally spaced apart, at least where they emerge from the plugs, and having their leading ends bent down (as shown at least as to some of these in Fig. 1). The plunger initially exists in its fully up position. The turret exists turned so that its stud 15 abuts one of the stops, as 16a in the present case. The armature is then introduced into passage 2b of the head with its commutator down and so that one of the grooves of its core body registers with the index 17, whereupon the lower end of the armature shaft, being stepped in the turret, is anchored to the latter by the screw 13. The nuts 10 on the shank of the plunger are assumed to have been previously adjusted so that when the plunger is at its upper limit the lower end of the core body will be somewhat above, and when the plunger is at its lower limit the upper end of the core body will be somewhat below the plane of the inner or outlet ends of the bores of the guides formed by the plugs, nipples and tubes 5. The depending ends of the wires, stripped, are now jammed in succession into the alternate slits of the commutator and thus anchored thereto and such slits thereupon packed with insulation in the usual way; but however the wires are anchored to an axial part of the core is not material so long as the latter thereby becomes a medium for pulling the wires down and hence through the aforesaid tubular guides. The plunger is now depressed to its limit, pulling down the turret and hence the armature and also the wires, so that the wires, in taut state, are laid in the respective grooves of the core body. Now, with the plunger at its lowest limit and the top of said body somewhat below the plane of emergence of the wires from said guides, what is in effect a unit formed by the turret and armature, is turned (as by the removable handle such as is shown dotted in Fig. 2 at z) until the stud 15 abuts the stop 16b, which operation lays the respective wires in chordal state across the upper end of said body, or until grooves thereof equally spaced from the respective grooves already occupied by the wires register with the outlet ends of the bores of said guides. Now the plunger and hence the armature is raised to the initial position, which lays the wires in the grooves now opposed to them. Finally, while the armature is in its last-mentioned position, the turret and hence the armature are turned until stud 15 again engages stop 16a. These operations are repeated until each wire has undergone the necessary number of turns to complete a coil or winding. Finally, the wires are cut off when the armature is in its up position and their cut-off ends jammed into the slits of the commutator not already occupied by their leading ends and such slits packed with insulation. Such further operations (having nothing to do with my invention), as clearing away so much of the insulation e as covers merely the periphery of the core body, may now be performed.

It is important that when the armature is in its down and when it is in its up position its upper end and its lower end should be respectively somewhat below and somewhat above the plane of emergence of the wires to the aperture so that when the ensuing rotary motion of the armature occurs the wires will be somewhat gradually bent off or curved (Fig. 8), thus to avoid the more or less sharp edges of the core body cutting through the insulation or stripping it from the wires.

Fig. 7 shows the distribution of the chordal portions of the wires at one end (the top) of the core body after the winding of the wires is completed to form a complete loop of each. They exist all uniformly dispersed or without localized piling and a consequent state of unbalance.

The plugs 3, being threaded into the head, are radially adjusted whereby they may be so set as to effect the winding of armatures whose core bodies may vary in diameter. In the example shown they are set so as to accommodate a core body of substantially the maximum diameter. In any event, to insure that the wires, notwithstanding possible kinks thereof, shall be deposited in the grooves the plugs should be so adjusted that their inner ends are quite close to the perimeter of the core body.

The general distribution of the wire on the core, according to the pattern shown by Fig. 7, is not new nor it is new simultaneously to assemble the wires with the core so as to develop that pattern. But my invention involves novelty in that, given structures, as the head on the one hand and the support formed by the rack and its arm on the other hand, the latter structure having means (as the turret) to which to anchor the core, it provides for supporting both such structures in a frame relatively to which one of the parts formed by the first-named structure and the core is free to rotate around the latter's axis and in which one such structure is movable back and forth lengthwise of said axis relatively to the other. But preferably, having regard to simplicity of construction and facility in respect to the manual operations involved, the first-named structure should be fixed and the second-named structure comprise a support (as the rack and its arm) having a turret rotative in but anchored to such support and to which to anchor the core.

Again, given the wires existing confined by a support against displacement transversely of themselves but free to move lengthwise toward a circular aperture of such support of greater diameter than the body of the core and in coincidence with and around whose margin the wires exist at substantially equally spaced points, that hereindisclosed method I believe to be novel which consists in affixing the wires to the axial projection of the core (here formed by the shaft and the commutator carried thereby) and in substantially equally spaced disposition around the same, and, while maintaining the core substantially coaxial with the aperture and with the core grooves in register with said points, effecting relative movement of the core and said support back and forth lengthwise of the core axis and so that on each such movement the core will enter and leave the aperture, and on each such lengthwise movement in one direction rotating the core in one direction and on each such lengthwise movement in the opposite direction rotating the core reversely.

Further, according to my method the wires are supported so as to project more or less inward of a circle of the same diameter as the outer perimeter of the core body, existing, in substantial coincidence with said circle, spaced apart the same as the grooves of the core body to be respectively occupied thereby, whereby, on positioning the core in coaxial relation to such circle and with the grooves in registry with the respective wires, relative movement effected as between the core and series of wires in the direction to cause the core to telescope the circle insures inevitable entry of the wires into the grooves.

Having thus fully described my invention, what I claim is:

1. In a machine for winding an armature core of the class described, the combination of structure providing a passage therethrough to receive the core and having wire guides extending substantially radially to and equally spaced around the passage, structure having means to which to anchor the core against displacement axially thereof, and a frame supporting both structures and relatively to which one of the parts formed by the first-named structure and the core is free to rotate around the axis of the core, one structure being movable in the frame back and forth relatively to the other lengthwise of said axis.

2. In a machine for winding an armature core of the class described, the combination of structure providing a passage therethrough to receive the core and having wire guides extending substantially radially to and equally spaced around the passage, structure having means to which to anchor the core against displacement axially thereof, and a frame supporting both structures and relatively to which one of the parts formed by the first-named structure and the core is free to rotate around the axis of the core, the second-named structure being movable in the frame back and forth relatively to the other lengthwise of said axis.

3. In a machine for winding an armature core of the class described, the combination of structure providing a passage therethrough to receive the core and having wire guides extending substantially radially to and equally spaced around the passage, structure having means to which to anchor the core against displaement axially thereof, and a frame supporting both structures and relatively to which the core is free to rotate around its axis, one structure being movable in the frame back and forth relatively to the other lengthwise of said axis.

4. In a machine for winding an armature core of the class described, the combination of structure providing a passage therethrough to receive the core and having wire guides extending substantially radially to and equally spaced around the passage, structure having means to which to anchor the core against displacement axially thereof, and a frame supporting both structures and relatively to which the core is free to rotate around its axis, the second-named structure being movable back and forth in the frame relatively to the other structure lengthwise of said axis.

5. In a machine for winding an armature core of the class described, the combination of structure providing a passage therethrough to receive the core and having wire guides extending substantially radially to and equally spaced around the passage, a support, a turret rotative in the support co-axially with, but confined to the support against movement relatively thereto lengthwise of the axis of, the passage and having means to anchor the core thereto, and a frame supporting said structure and support and in which one of them is movable lengthwise of said axis.

6. The combination set forth in claim 5 characterized by said support having means to limit rotation of the turret.

7. In a machine for winding an armature core of the class described, the combination of structure providing a passage therethrough to receive the core and having wire guides extending substantially radially to and equally spaced around the passage and their ends adjoining the passage all in substantially a common plane, structure having means to which to anchor the core against displacement axially thereof, a frame supporting both structures and relatively to which one of the parts formed by the first-named structure and the core is free to rotate around the axis of the core, one structure being thrustwise movable back and forth in the frame relatively to the other lengthwise of said axis and to such extent in each direction that said core will stand clear of said plane, and means, adjustable lengthwise of said axis, to limit the movement of such thrustwise movable structure.

8. In a machine for winding an armature core body having longitudinal wire-receiving peripheral grooves, the combination of a head having a passage through which said body may pass, and tubular wire-guiding plugs arranged in the head proper in radiating relation to said passage and each radially adjustable in the head proper.

9. In a machine for winding an armature core body having longitudinal wire-receiving peripheral grooves, structure having a passage through which said body may pass and wire-guiding bores in radiating relation to said passage, each bore having its end adjacent the passage restricted and also cross-sectionally elongated lengthwise of said passage.

10. The method of assembling, with an armature core including a cylindrical body having equally spaced longitudinal grooves and an axial projection extending from the body, a series of wires existing confined by a support against displacement transversely of themselves but free to move lengthwise toward a circular aperture of such support of greater diameter than said body and in coincidence with and around whose margin the wires exist at substantially equally spaced points, which consists in affixing the wires to said projection and in substantially equally spaced disposition around the same, and, while maintaining the core substantially coaxial with said aperture and with the core grooves in register with said points, effecting relative movement of the core and said support back and forth lengthwise of the core axis and so that on each such movement the core will enter and leave the aperture, and on each such lengthwise movement in one direction rotating the core in one direction and on each such lengthwise movement in the opposite direction rotating the core reversely.

11. In the art of forming an armature including a substantially cylindrical core having longitudinal grooves in its body and a series of wires having portions thereof extending lengthwise of and through said grooves, the method of entering the wires into the grooves which consists in supporting the wires independently of the core and so that they project inward of a circle of the same diameter as the outer perimeter of said body and are spaced apart, in substantial coincidence with said circle, the same as the grooves to be respectively occupied thereby, positioning the core in substantially coaxial relation to such circle and with the grooves respectively in registry with the wires, and then effecting relative movement as between the core and said series of wires in the direction and sufficiently to cause the core to telescope the circle.

HENRY VAILLANT.